3,268,262
WHEEL COVER
Albert J. Gonas, Grosse Pointe, and George A. Schmidt, Southfield, Mich., assignors to General Motors Corporation, Detroit, Mich., a corporation of Delaware
Filed Aug. 7, 1964, Ser. No. 388,167
7 Claims. (Cl. 301—37)

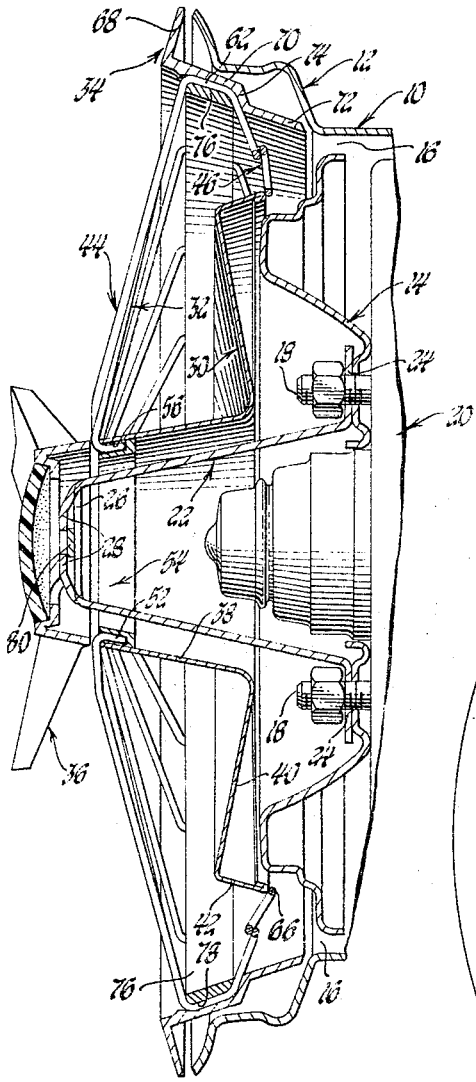

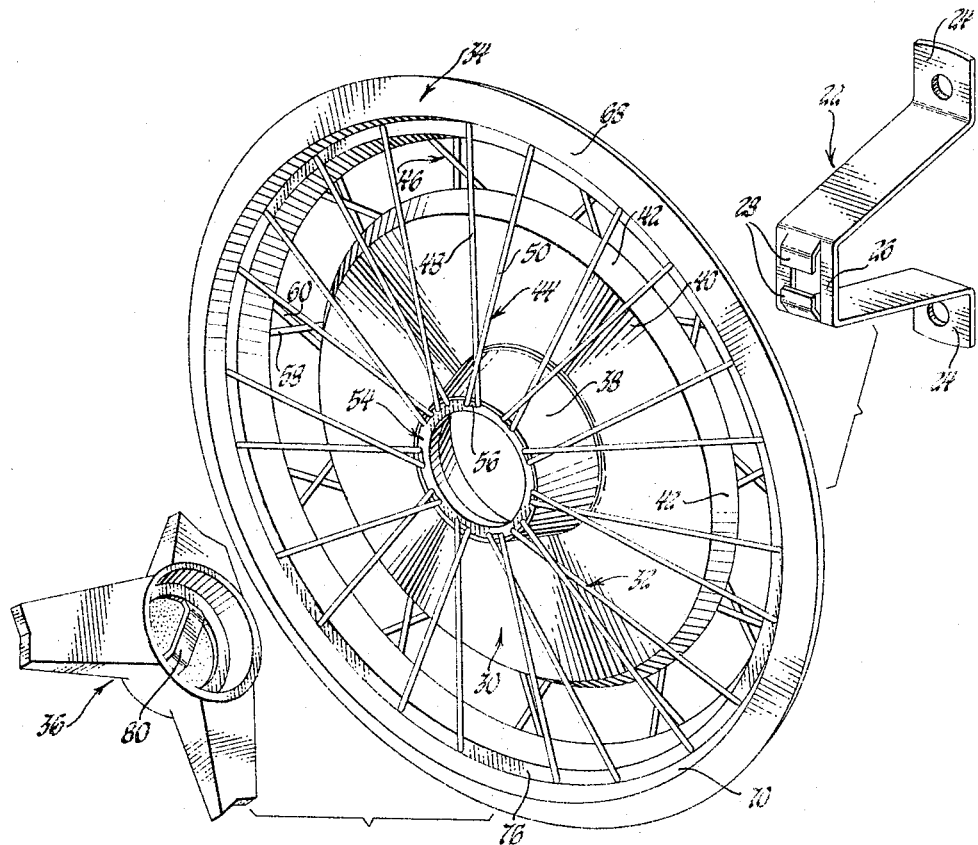
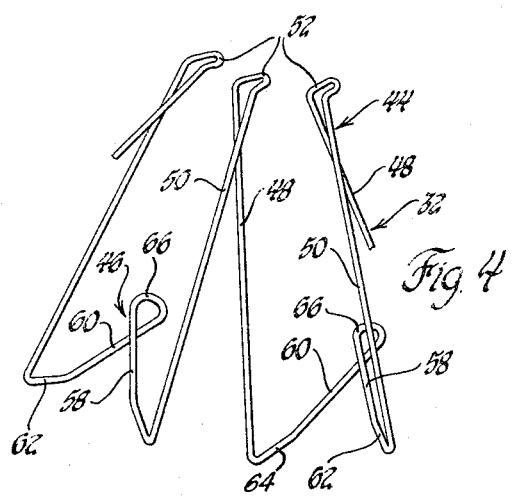

This invention relates to wheel covers and more particularly to a wire wheel cover assembly.

One feature of this invention is that it provides a wire wheel cover assembly having a plurality of axially spaced rows of spokes, all of which are formed by a continuous wire. Another feature of this invention is that one of the rows is of less radial extent than another row. A further feature of this invention is that the spokes of the rows alternate circumferentially of the cover so that each spoke is clearly visible when viewed from the exterior of the cover. Yet another of the features of this invention is that the cover includes an axially inner decorative member, with one of the rows of spokes having its radially inner edge secured to a radially outer portion of this member and the other of the rows of spokes having its radially inner edge secured to a radially inner portion of this member. Yet a further feature of this invention is that it provides a wire wheel cover assembly having a plurality of axially spaced rows of spokes interconnected with each other, with the connecting portions of the rows of spokes being secured to a trim ring to conceal such portions and also support the trim ring in covering relationship to the rim of the wheel.

These and other features of the wire wheel cover assembly of this invention will be readily apparent from the following specification and drawings wherein:

FIGURE 1 is a sectional view of a vehicle wheel having a wheel cover according to this invention mounted thereon;

FIGURE 2 is a partially broken away partial front elevational view of the cover;

FIGURE 3 is an exploded perspective view; and

FIGURE 4 is a perspective view of the spokes.

Referring now particularly to FIGURE 1 of the drawings, a vehicle wheel designated generally 10 includes an annular rim 12 and a spider or body 14 which is welded or otherwise secured to the rim 12 at a number of circumferentially spaced locations, not shown, with openings 16 being left between the rim and the spider intermediate the locations at which the two are secured together. The wheel 10 is of conventional structure and forms no part of this invention. A number of bolts 18 secure the wheel 10 to the axle assembly 20 of the vehicle.

A generally U-shaped cover mounting member 22 has apertured lateral flanges 24 thereof secured to the axle assembly of the vehicle by two of the bolts 18. The base or bight 26 of the member 22 includes a pair of oppositely extending, offset lanced tabs 28 for a purpose to be hereinafter described.

The cover assembly generally includes an inner annular cover member 30, a spoke assembly 32, a trim ring or outer annular cover member 34, and a knock-off type hub 36. The member 30 includes a central frusto-conical shaped dome or crown portion 38 which merges into a radially and axially outwardly extending annular portion 40 terminating in a radially outwardly and axially inwardly extending annular flange 42. The member 30 forms the inner decorative portion for the cover assembly and also substantially conceals the spider 14 of the wheel 10.

The spoke assembly 32 includes axially outer and axially inner rows of spokes 44 and 46, respectively, formed by a continuous length of wire. The spokes 44 each include a pair of members 48 and 50 which are arranged in X fashion with respect to each other. The radially inner ends of the members 48 and 50 are integrally joined by a loop portion 52, FIGURE 4. The loop portions 52 of all of the spokes 44 are bent laterally or normal to the spokes so as to extend radially outwardly and axially inwardly of the cover assembly and within the opening of central dome or crown portion 38 of the member 30. An annular member 54 is formed with an annular spaced series of pockets 56 which receive the bent loop portions 52 of the spokes 44 and secure these portions to the member 30.

The spokes 46 each include a pair of members 58 and 60 which are arranged in X fashion with respect to each other, the same as the members 48 and 50. The members 50 of each of the spokes 44 are secured to the members 58 of each of the spokes 46 by short axially and circumferentially extending portions 62, and the members 48 of each of the spokes 44 are likewise secured to the members 60 of the spokes 46 by short axially and circumferentially extending portions 64 which extend circumferentially opposite to the portions 62, FIGURE 4. The radially inner ends of the members 58 and 60 are interconnected by integral loop portions 66 which engage and may be secured to the circumferential edge of the flange 42 of member 30. Prior to assembly with member 30, the rows 44 and 46 of spokes are preferably located at a less angular spacing than shown in FIGURE 1 so that the loop portions 52 and 66 will tightly engage the respective radially inner and radially outer edges of the member 30 after assembly.

The trim ring 34 includes a generally radially and axially outwardly extending flange 68 which merges into a radially and axially inwardly extending annular flange 70 which is joined to a like flange 72 by an offset juncture flange 74. The loop portions 62 and 64 seat against the flange 70 and the radially outer ends of the members 58 and 60 seat against the flange 74 as shown in FIGURE 1. An annular member 76 which is preferably split includes pockets 78 which are arranged so as to receive the portions 62 and 64 to circumferentially locate these portions with respect to the trim ring 34.

After the members 30, 32 and 34 are assembled to each other, the resultant assembly is then mounted on the wheel by fitting the member 30 over the member 22. Thereafter an offset tongue or lug 80 of the member 36 is first fitted between the tabs 28 of the member 22 and thereafter slightly rotated so as to locate the tongue 80 between the tongues 28 and the base 26 of the member 22 as shown in FIGURE 2 and locate the cover in place on the wheel.

By forming the rows 44 and 46 from a continuous length of wire, a much more rigid structural assembly results and also ease of assembly and an economical manufacture are also obtained.

Thus, this invention provides an improved wheel cover.

We claim:

1. The combination comprising, a vehicle wheel, a pair of annular wheel cover members, means mounting one of said members on a portion of said wheel, a plurality of axially spaced rows of spokes secured to said one cover member, said rows being formed from a continuous length of wire and extending radially of said one cover member, and means securing said other cover member to said spokes in radially spaced relationship to said one cover member.

2. The combination recited in claim 1 wherein the spokes of each row alternate circumferentially of the cover.

3. The combination recited in claim 1 wherein each of said spokes each include a pair of members arranged in X fashion with respect to each other.

4. The combination recited in claim 1 wherein said rows of spokes are interconnected adjacent one radial end thereof and are secured at their other radial ends to radially spaced portions of said mounting member.

5. The combination recited in claim 1 wherein said rows are integrally connected to each other at their radially outer ends, means connecting the radially inner ends of the rows of spokes to said one cover member and said other cover member being secured to the radially outer interconnected ends of the rows of spokes.

6. The combination recited in claim 1 wherein said wheel includes a wheel body and a rim portion secured thereto, said one cover member covering a substantial portion of said wheel body and said other cover member comprises a trim ring covering a portion of said wheel rim portion.

7. The combination recited in claim 1 wherein said one cover member includes axially spaced radially inner and outer edge portions, one of said rows of spokes having the free ends thereof secured to one of said edge portions and the other of said rows of spokes having the free ends thereof secured to the other of the edge portions, the other interconnected ends of said rows of spokes being secured to said other cover member.

References Cited by the Examiner
UNITED STATES PATENTS

| | | | |
|---|---|---|---|
| 1,432,191 | 5/1924 | Lachman | 301—58 |
| 2,494,366 | 1/1950 | Simcich | 301—108 |
| 2,709,113 | 5/1955 | Plotkin | 301—37 |
| 2,709,114 | 5/1955 | Plotkin | 301—37 |
| 2,835,535 | 5/1958 | Wood | 301—37 |

BENJAMIN HERSH, *Primary Examiner.*

R. J. JOHNSON, *Assistant Examiner.*